(a)

(b)
(c)

(d)

(e)

United States Patent Office 3,116,426
Patented Dec. 31, 1963

3,116,426
LOGIC CIRCUITS EMPLOYING BRIDGE NETWORKS COMPRISING TRANSFORMER SECONDARIES AND N-TYPE CONDUCTIVITY CURVE NEGATIVE RESISTANCE ELEMENTS
Shintaro Oshima, Musashino-shi, Hajime Enomoto, Ichikawa-shi, Shiyoji Watanabe, Shinjuku-ku, Tokyo-to, and Kitsutaro Amano, Ota-ku, Tokyo-to, Japan, assignors to Kokusai Denshin Denwa Kabushiki Kaisha, Tokyo-to, Japan, a joint-stock company of Japan
Filed Nov. 14, 1960, Ser. No. 69,165
Claims priority, application Japan Nov. 16, 1959
14 Claims. (Cl. 307—88.5)

This invention relates to logical circuits and more particularly to an improved logical element.

The present invention is adaptable, in general, to negative resistance elements having "N" type characteristics, but in the following description particular reference shall be made to the Esaki diode (tunnel diode) as a representative example of a negative resistance element. The Esaki diode, because of the fact that its functional mechanism is based on the tunnel effect of quantum mechanics, has such special features as considerably higher functional speed than such devices as transistors, stable characteristics, miniature size, and low price.

It is an object of the present invention to provide a novel, logical element which has the abovementioned features and is yet simple in construction.

Said object and other objects of the present invention have been attained by a logical element wherein two negative-resistance elements each having an "N"-form characteristic curve and another impedance element are assembled to form an electrical bridge. In operation the information signal from the preceding stage is applied to one of the output terminals of the bridge to impart bias so as to cause a stable state corresponding to the polarity of the pulse. Then exciting power is applied to the other opposing terminal; and, by utilizing the substantial variation in the impedance presented in accordance with the stable state, an output of a polarity corresponding to the polarity of the input information pulse is obtained.

The details of the invention, its principle, and the manner, in which the foregoing as well as other objects and advantages may best be achieved, will be best understood from a consideration of the following description, taken in conjunction with the accompanying illustrations in which the same or equivalent parts or quantities are designated by the same reference numerals or letters, and in which.

Figure 3A:
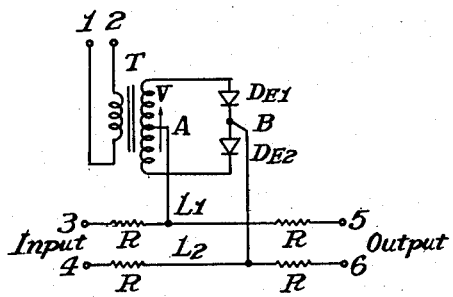
FIGS. 3A and 3C are diagrams of an embodiment of the invention and modifications thereof.
Figure 7A:
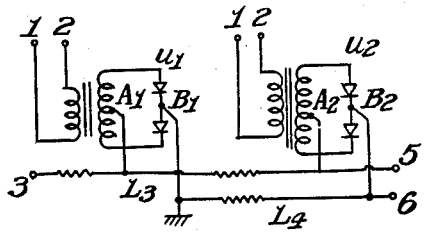
Figure 7B:
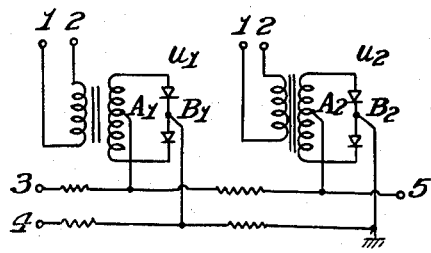
Figure 7C:
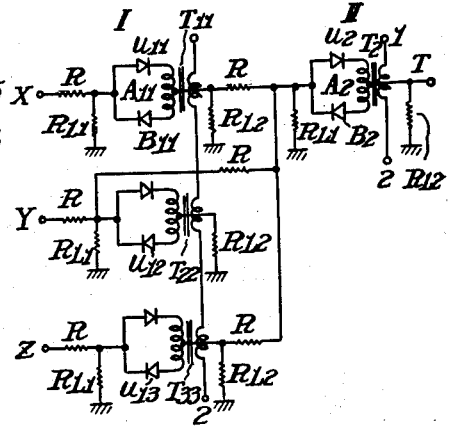
Figure 8:
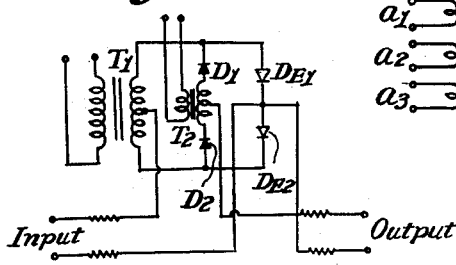
Figure 11:
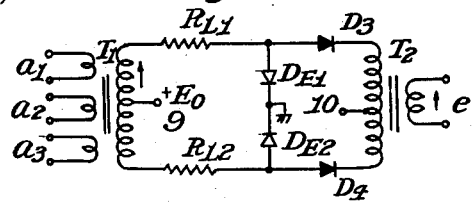
Figure 9A:
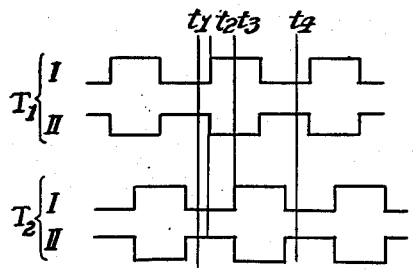
Figure 9B:
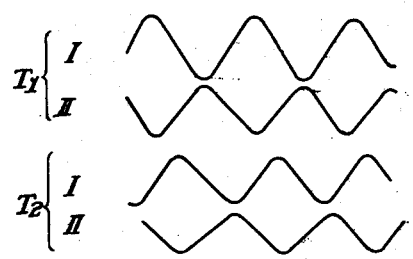
Figure 10B:
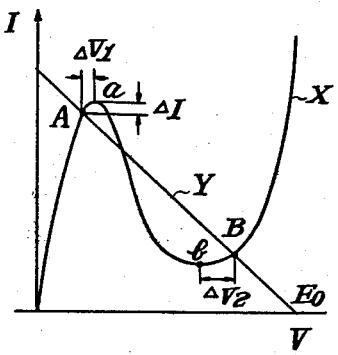
Figure 12:
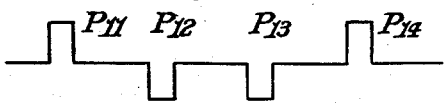
Figure 12:
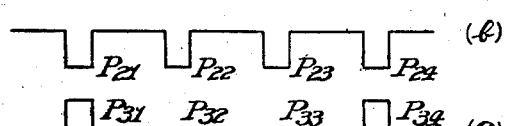
Figure 10A:
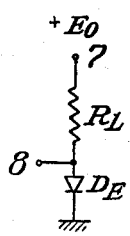
Figure 10A:
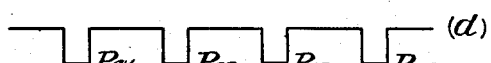
Figure 10A:
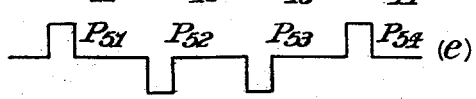

FIGS. 7A, 7B, and 7C are connection diagrams showing further modifications of the modifications of the embodiment of FIG. 3A;

FIG. 8 is a connection diagram showing another embodiment of the invention;

FIGS. 9A and 9B are wave form diagrams;

FIGS. 10A and 10B are, respectively, a connection diagram and a graph for describing the present invention;

FIG. 11 is a circuit diagram showing yet another embodiment of the invention;

FIG. 12 is a wave form diagram; and

Figure 13:
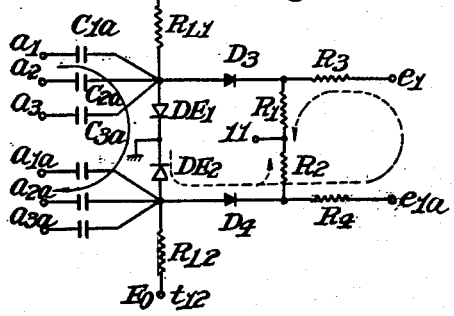

FIG. 13 is a circuit diagram showing a further embodiment of the invention.

Figure 1A:
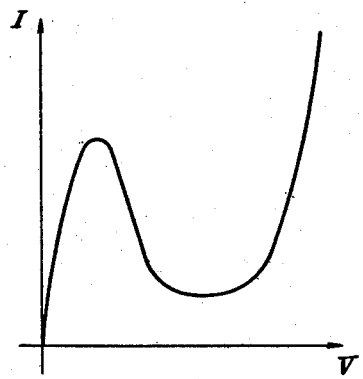
FIG. 1A is a graphical representation of the current-voltage characteristic of an Esaki diode for a case wherein a normal-direction voltage is impressed thereon.
Figure 1B:
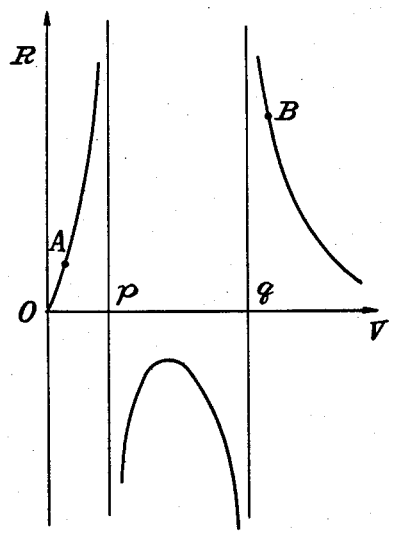
FIG. 1B is a graphical representation showing the relationship, derived from the characteristic curve of FIG. 1A, between resistance R and voltage V.

As shown in FIG. 1A, the voltage-current characteristic exhibited in an Esaki diode when a voltage in the normal direction is impressed thereon indicates a negative resistance character of dynatron type. The values of the resistance R determined from this characteristic curve and plotted against the voltage V are shown in FIG. 1B. The interval $p$–$q$ of this curve is a region of negative resistance, and in the vicinity of the ordinates passing through these points, the resistance dips at a rapid rate. The present invention utilizes the variations of this negative resistance and the resistance (impedance) with respect to the voltage.

Figure 2A:
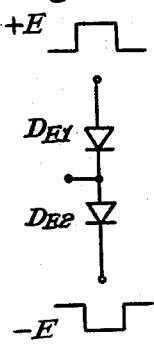
FIGS. 2A and 2B are, respectively, a diagram and a graph for describing the principle of the present invention.
Figure 2B:
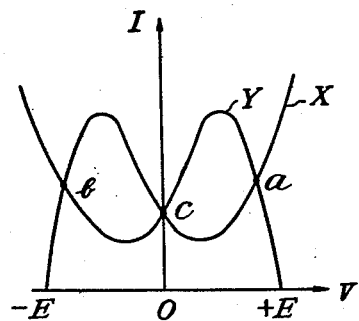

The principle of the invention may be explained with the aid of FIGS. 2A and 2B. FIG. 2A shows a connection diagram wherein two Esaki diodes $D_{E1}$ and $D_{E2}$ are connected in series in the same direction. If symmetrical exciting voltages E+ and E− are applied on the two terminals of the above described connection, the voltage-current characteristic of the arrangement will be such that it may be represented, as in FIG. 2B, by a characteristic curve X of the diode $D_{E1}$ and a characteristic curve Y of the diode $D_{E2}$ (that is, a load curve with respect to $D_{E1}$), the said curve Y having a form which is that of the said curve X inverted by revolution of 180 degrees about the ordinate axis. Accordingly, the electric potential of the connection point of $D_{E1}$ and $D_{E2}$ has the possibility of assuming the values at three intersections $a$, $b$, and $c$ of the said curves X and Y. Of these three points, however, point $c$ is in the negative resistance regions of both said curves. Therefore, point $c$ is an unstable point, and the electric potential of the said connection point becomes stable only when it reaches the value at point $a$ or point $b$. In this case, at point $a$, the diode $D_{E1}$ is in a state of low impedance, and the diode $D_{E2}$ is in a state of high impedance. At point $b$, conversely, $D_{E1}$ is in a state of high impedance, and $D_{E2}$ is in a state of low impedance. The point $a$ is at a positive potential and the point $b$ is at a negative potential relative to the grounded electric potential, and it is possible to make these points correspond to the 1, 0 states of binary digit logic. Whether the electric potential of the aforesaid connection point will be at point $a$ or point $b$ is determined by an extremely low, direct-current voltage applied beforehand on the connection point when the exciting voltages E+ and E− are to be applied.

When such a negative resistance element wherein one side assumes high impedance, and the other assumes low impedance is inserted in a bridge, the balance of the bridge is disturbed, and a corresponding, unbalanced current flows through an impedance connected to the output terminals of the bridge.

A connection diagram indicating one embodiment of the invention which utilizes the above-described principle is shown in FIG. 3A. A bridge is formed by the secondary winding of a transformer T and two Esaki diodes $D_{E1}$ and $D_{E2}$ connected in series, and the midpoint A of the secondary winding of the transformer T and the connection point B of the diodes $D_{E1}$ and $D_{E2}$ are connected as input terminals to the coupling lines $L_1$ and $L_2$, respectively, coupling resistances R are inserted in the said lines $L_1$ and $L_2$ as shown.

With the above-described circuit arrangement, when a pulse voltage on the terminals 1 and 2 of the transformer T, thus applying an exciting voltage V to both ends of the series circuit of the diodes $D_{E1}$ and $D_{E2}$ and, at the same same, an extremely low voltage is applied between the input terminals 3 and 4 of the coupling lines, in accordance with the polarity of the said extremely low voltage, the diodes $D_{E1}$ and $D_{E2}$ settle into a stable state corresponding to either point $a$ or point $b$ of FIG. 2B. Now if the electric potentials of the aforesaid midpoint A and the aforesaid connection point B are compared for the cases of stable settling at the point $a$ and at the point $b$, as will be apparent from the foregoing description, the potential of A will be less than that of B for the case of stable settling at the point $a$, and the reverse will be true for the case of stable settling at the point $b$. Consequently, if, for example, the output terminals 5 and 6 are connected through such a device as a resistor, an amplified and modulated current will flow, in accordance with the polarity of the aforesaid extremely low voltage imparted between the terminals 3 and 4, from point B toward point A in the case of said settlement at point $a$, and from point A toward point B in the case of said settlement at the point $b$.

Figure 4:
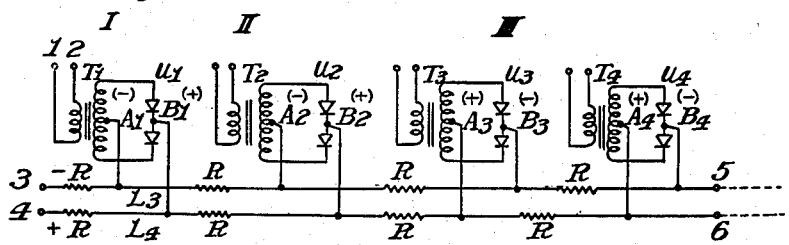
FIG. 4 is a connection diagram showing the circuits of FIG. 3A connected in series.

Accordingly, by successively connecting several circuits as shown in FIG. 3A through coupling resistances R as indicated in FIG. 4, it is possible to accomplish in $a$ an extremely simple manner and, moreover, at high speed such operations as one-way transmission of information signals and negation operation.

Figure 5A:
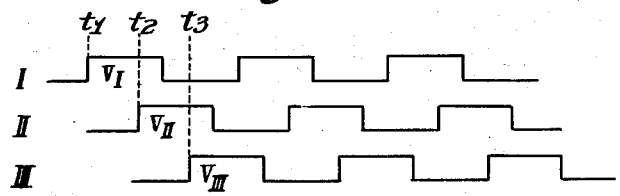
FIGS. 5A and 5B are wave form diagrams for describing the operation of an embodiment of the invention.

That is, as shown in FIG. 4, several circuits of the arrangement shown in FIG. 3A are adapted as unit element $u_1$, $u_2$, $u_3$, and $u_4$, which are connected in series through intermediate coupling resistances R. Then, three-phase, exciting voltages of rectangular wave form, with phase difference of 120 degrees between the phases I, II, and III as indicated in FIG. 5A, is impressed successively on the primary windings of the exciting transformer $T_1$, $T_2$, $T_3$, and $T_4$. (This exciting voltage may be of multiphase composition whose number of phases is more than three.) Now, referring to FIG. 5A, if at time $t_1$, a rectangular wave form voltage $V_1$ of phase I is applied on the primary winding of the transformer $T_1$, a voltage V is generated in the secondary winding of the said transformer $T_1$ when a voltage of + and − polarities such as shown in FIG. 4 is impressed, during the generation of the said voltage V, as an information signal across the input terminals 3 and 4, the point $B_1$ will assume a higher electric potential than the point $A_1$, as was described in conjunction with FIG. 3A, that is, the state of the unit element will become that of the point $a$ in FIG. 2B (+ condition being assumed here). Since the unit element $u_2$ is connected through the resistances R, current will flow as follows: $B_1 \rightarrow R \rightarrow B_2 \rightarrow A_2 \rightarrow R \rightarrow A_1$. If, while this condition is continuing, a rectangular wave form voltage $V_{II}$ of phase II is applied at time $t_2$ on the primary winding of the transformer $T_2$, a voltage V will be generated in the secondary winding thereof, and the state of the unit element $u_2$ will similarly become that wherein the point $B_2$ will be at a higher electric potential than the point $A_2$, that is, the state of the point $a$ (+) of FIG. 2B. In effect, this is the same as shifting the information signal of $u_1$ to $u_2$.

In the succeeding operation, a rectangular wave form voltage $V_{III}$ of phase III is applied at time $t_3$ on the primary winding of the transformer $T_3$ to cause the generation of a voltage V in the secondary winding thereof. In this case, however, since the connection points $A_3$ and $B_3$ are connected, respectively, to coupling lines $L_4$ and $L_3$, current will flow, while the unit element $u_2$ is in the operational condition, as follows: $B_2 \rightarrow R \rightarrow A_3 \rightarrow B_3 \rightarrow R \rightarrow A_2$. (Although current will flow also in the path:

$$B_2 \rightarrow R \rightarrow B_1 \rightarrow A_1 \rightarrow R \rightarrow A_2$$

since the unit element $u_1$, in this case, is in a state of rest wherein the exciting voltage is not applied the said element $u_1$ will not operate.) Accordingly, the unit element $u_3$ will be in a state wherein the point $A_3$ is at a higher electric potential than the point $B_3$, that is, the state (−) of the point $b$ in FIG. 2B. In other terms, by merely changing the connections between the points $A_3$ and $B_3$ and the coupling lines as described above, it is possible to cause, in an extremely simple manner, negation operation.

In exactly the same manner, the state (−) of unit element $u_3$ may be shifted to the unit element $u_4$ by connecting points $A_4$ and $B_4$, respectively, to the lines $L_4$ and $L_3$ and applying the voltage of phase I at time $t_4$ on the primary winding of the transformer $T_4$.

Figure 6:
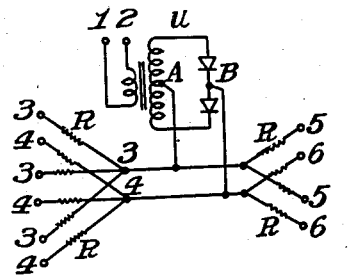
FIG. 6 is a connection diagram showing another modification of the embodiment of FIG. 3A.

FIG. 6 shows a connection diagram for the purpose of logical operations of logical addition (sum) and logical multiplication (product). The connection points A and B are connected through respective resistances to an odd number (three in the case of FIG. 6) of sets of the input terminals 3 and 4. In this case, if information signal currents of equal amplitude are applied simultaneously on the odd-number sets of the input terminals and a rectangular wave form current is made to flow through the exciting terminals 1 and 2, an extremely low voltage of a polarity which is determined by the majority of current flow directions of the information signals imparted on the various input terminals 3 and 4 will be impressed on the points A and B. The result will then be equivalent to the effecting of majority-decision, logical operation of the odd-number inputs, and the unit element $u$ will settle in the stable state represented by the point $a$ or the point $b$ in FIG. 2B. Therefore, a logical addition can be accomplished by making one of the three inputs to be always a positive voltage; and logical multiplication can be accomplished by applying a constantly negative voltage as one of the three inputs. Moreover, when branch outputs are to be taken, this may be accomplished as indicated in FIG. 6 by connecting two or more sets of output terminals 5 and 6, respectively, through coupling resistances R to the points A and B.

Figure 3C:
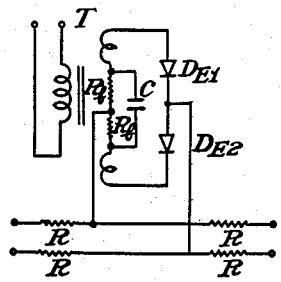
Figure 5B:
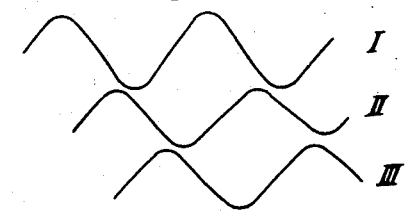

It is not necessary to limit the exciting voltage, invariably, to only one of rectangular wave form, it being possible to utilize, also, only a sinusoidal wave form. When an exciting voltage of a sinusoidal wave form as shown in FIG. 5B is to be applied, if resistances $R_b$ and capacitance C for bias are inserted at the midpoint of the secondary winding of the transformer T as indicated in FIG. 3C, the mark space ratio of the output signal will be increased by the action of the auto-bias voltage generated at the point of insertion, whereby it will be possible to obtain a positive and reliable operation.

While all of the above-described circuits are of the type wherein the input and output terminals are isolated from a grounded electric potential, that is, they are so-called balanced type circuits, it is possible to connect a circuit of this type with a so-called unbalance type circuit wherein one of either the input or output terminals is grounded. FIGS. 7A and 7B are circuit diagrams showing embodiments of this case. FIG. 7A shows a circuit for converting unbalanced signals into balanced signals by the grounding of the side of $B_1$ of the unit element $u_1$, and this circuit is used principally as an input circuit when it is to be connected to outside circuits. FIG. 7B shows a circuit for converting balanced signals into unbalanced signals by the grounding of the side of $B_2$ of the unit element $u_2$, and this circuit is used principally as an output circuit.

Furthermore, when logical operations are to be accomplished by coupling with an unbalanced type, it is possible to do so by coupling as indicated in FIG. 7C.

FIG. 8 shows a circuit diagram of one embodiment of the invention wherein the above-described circuit is combined with ordinary diodes. By using a negative resistance element and ordinary diodes in this manner, it is possible to attain the required result through the use of two-phase exciting power.

In this circuit, the coupling of the transformer $T_1$ with the diodes $D_{E1}$ and $D_{E2}$ is similar to that shown in FIG. 3A, but a transformer $T_2$ for applying a reading-out voltage and ordinary diodes $D_1$ and $D_2$ are added. In this case, also, by inserting an auto-bias circuit in the midpoint of the secondary winding of the transformer $T_1$ as indicated in FIG. 3C, it is possible to apply an exciting voltage of sinusoidal wave form, as indicated in FIG. 9B, as the exciting voltage to the primary winding of the exciting transformer $T_1$.

First, the condition of the element for phase I and at the time $t_1$ of FIG. 9A will now be considered. When a positive or negative voltage is applied through the input side, a current corresponding to said voltage flows through the bridge composed by the transformer $T_1$ and diodes $D_{E1}$ and $D_{E2}$. Next, at a time $t_2$, when an exciting voltage is applied on the transformer $T_1$, the stable state assumed by diodes $D_{E1}$ and $D_{E2}$ is determined by the aforesaid input current to be at either point $a$ or point $b$ as was described previously.

On the other hand, an exciting voltage which is lagging approximately 90 degrees in phase is being applied on transformer $T_2$ as indicated in FIG. 9A. Therefore, in the time interval $t_1 \sim t_3$, since the diode $D_1$ and $D_2$ are in a non-conductive condition, no output whatsoever is obtainable at the output terminals. Then, when a reading-out voltage is applied on the transformer $T_2$ at a time $t_3$, the diodes $D_1$ and $D_2$ assume a conductive condition, and an output appears at the output terminals of the bridge formed by the diodes $D_{E1}$, $D_{E2}$, $D_1$, and $D_2$. This output obtained is positive or negative depending on which of the diodes $D_{E1}$ and $D_{E2}$ has the higher impedance. This output is applied on the circuit corresponding to phase II to carry out the required logical action. Then, at a time $t_4$, diodes $D_1$ and $D_2$ assume a non-conductive condition, diode $D_{E1}$ and $D_{E2}$ assume a condition of reverse-direction current, and the circuit is set in the original state. Simultaneously, the output of the preceding stage is applied on the input terminals, and the same operation is repeated. In this case, also, voltage of sinusoidal wave form as indicated in FIG. 9B may be used as the exciting voltage for the transformer $T_2$.

Next, a circuit wherein the fact that the impedance of a negative resistance element varies greatly depending on the voltage is utilized, and, by suitably arranging diodes of ordinary rectifying characteristic, reading-out is accomplished. If a suitable load resistance $R_L$ is connected, as indicated in FIG. 10A, to an Esaki diode, and a voltage $Eo$ is applied to the terminal 7 so as to obtain such a load curve as, for example, load curve Y shown in FIG. 10B, it will become possible for two stable points A and B at the intersections of the characteristic curve X and the load curve Y to exist. Then, in order to switch the stable point from point A to point B, a positive voltage which is higher than $\Delta V_1$ corresponding to the voltage in the interval $Aa$ of FIG. 10B is applied on terminal 7 to cause a current $\Delta I$ to flow and pass through the maximum point of the characteristic curve, whereupon the stable point, thereafter, is caused by the regeneration effect of the negative resistance to reach the point B at a rapid rate. Conversely, in order to switch the stable point from point B to a point A, a load voltage which exceeds $\Delta V_2$ corresponding to the voltage in the interval $Bb$ is applied on terminal 7 or terminal 8.

The resistance of an Esaki diode which is in the state of point A or point B is at a relatively low value. However, as is apparent from FIG. 1B, if, in the state of point A, a negative voltage is applied, the resistance value will become still lower, and it will become easier to cause current flow. In the state of point B, on the other hand, if a negative voltage (in this case, it must be lower than $\Delta V_2$) is similarly applied on the terminal 8, the resistance value will conversely become higher until it approaches infinity, and it will become difficult to cause current to flow. In other terms, with respect to a negative voltage impressed on the terminal 8, the diode $D_E$ in the state of point A offers low impedance, while the diode $D_E$ in the state of point B offers high impedance.

FIG. 11 is a connection diagram illustrating one embodiment of this invention for the case wherein two Esaki diodes $D_{E1}$ and $D_{E2}$ and load resistances $R_{L1}$ and $R_{L2}$ are connected in push-pull arrangement to form a bridge, and an input transformer $T_1$ and an output transformer $T_2$ are used, respectively, in the input and output circuits. A suitable voltage as afore-described is kept applied on the terminal 9.

Initially, both of the diodes $D_{E1}$ and $D_{E2}$ are maintained in the set state, that is, in the state at the stable point A. Then, if an information signal is impressed on the input terminals $a_1$, $a_2$, and $a_3$ with respect to the iodes $D_{E1}$ and $D_{E2}$ in this state, and a pulse voltage, that is, a positive voltage which exceeds $\Delta V_1$ as indicated at $P_{11}$ of FIG. 12, is generated in the secondary side of the transformer $T_1$ in the direction of the arrow, the diode $D_{E1}$ will be switched to the stable point B, but the diode $D_{E2}$ will not be switched and will remain at the stable point A.

The references $D_3$ and $D_4$ designate ordinary diodes which are for the purpose of preventing the flow of input pulse and voltage due to switching in the output transformer. Normally, a reverse bias voltage is maintained on the terminal 10. If, as is indicated in FIG. 12(b), a negative pulse $P_{21}$ for reading-out, which is higher than $\Delta V_2$, is then impressed on the terminal 10, since $D_{E1}$ offers high impedance, and $D_{E2}$ offers low impedance, the pulse current for reading-out will flow principally through the diode $D_{E2}$ in the direction of the arrow through the primary side of the transformer $T_2$. Accordingly, a positive, reading-out voltage of the same polarity as the input pulse is generated, as is indicated at $P_{31}$ of FIG. 12(c), at the terminal $e$ of the secondary side. Simultaneously, the diode $D_{E1}$ is returned to the condition of stable point A, that is, the set state.

If, when an information signal is impressed on the input terminals $a_1$, $a_2$, and $a_3$, a negative pulse exceeding $\Delta V_1$ is generated as indicated at $P_{12}$ in FIG. 12(a), in the secondary side of the transformer $T_1$, the actions of the diodes $D_{E1}$ and $D_{E2}$ will be reversed. Then, when a negative pulse for reading-out, as indicated by $P_{22}$ in FIG. 12(b), is impressed on the terminal 10, a negative, reading-out voltage, which is the same polarity as the input pulse, as indicated by $P_{32}$ in FIG. 12(c), is generated at the output terminal $e$ of the transformer $T_2$.

Thus, by connecting two Esaki diodes in push-pull arrangement as described above, it is possible to obtain an output pulse of the same polarity as the input signal pulse. In this case, it is possible to perform majority-decision logical operations at the input winding side of an odd number of input transformers $T_1$ by means of the input signals from the input terminals $a_1$, $a_2$, $a_3$, etc. It will be obvious that, if the secondary winding of the output transformer $T_2$ is wound in the opposite direction, an output pulse which is of reverse polarity relative to the input pulse will be obtained, and it will be possible to perform negation operation.

Accordingly, if several circuits of the same construction as this circuit are connected in cascade arrangement, the output signals $P_{31}$ through $P_{34}$ of the terminals $e$ are applied as the input of the succeeding stage, and, as indicated in (b) and (d) of FIG. 12, the reading-out pulses $P_{21}$ through $P_{24}$ and $P_{41}$ through $P_{44}$ of the preceding stage and succeeding stage are caused to be driven by two phases, the output pulse of the succeeding stage, as indicated by $P_{51}$ through $P_{54}$ of FIG. 12(e), is taken out as the information signal of the same system with respect to the input information signal of the preceding stage as indicated by $P_{11}$ through $P_{14}$ of FIG. 12(a). Therefore, in such a manner, it is possible to cause the transmission of information to have a unidirectional character.

While the foregoing description has dealt with the case wherein transformers are used in the input and output circuits, other embodiments of the invention as indicated in FIG. 13 are also effective. In the embodiment illustrated in FIG. 13, coupling capacitors $C_{1a}$, $C_{2a}$, $C_{3a}$ . . . are used on the input side, and output resistance $R_1$, $R_2$, and coupling resistances $R_3$, $R_4$ (whose function is to prevent the output current from flowing into other circuits) are used on the output side. When an input signal pulse is impressed between each input terminal pair $a_1$ and $a_{1a}$, $a_2$ and $a_{2a}$ . . . , and voltage is applied in the direction of the full-line arrow, the Esaki diode $D_{E1}$ is switched to the stable point B, and Esaki diode $D_{E2}$ remains at the stable point A similarly as in the case illustrated in FIG. 10B. Then, when a negative pulse for reading-out is impressed on the terminal 11, $D_{E1}$ offers high impedance, and $D_{E2}$ offers low impedance. Accordingly, the current flows principally through $D_{E2}$ as indicated by the dotted-line arrow, and a negative pulse of reverse polarity relative to the input signal pulse is taken out between the output terminals $e_1$ and $e_{1a}$. Also, when an input signal pulse is impressed on each input terminal, if the voltage applied on the diodes $D_{E1}$ and $D_{E2}$ is a negative pulse of opposite polarity, the polarity of the output pulse taken out of the output terminals also will become opposite, that is, positive pulse, and negation operation will, of course, be performed. Furthermore, the possibility of the logical operation performing majority-decision operation through the coupling capacitors on the input side is the same as in the case illustrated in FIG. 11.

Since it is obvious that many changes and modifications can be made in the above described details without departing from the nature and spirit of the invention, it is to be understood that the invention is not to be limited to the details described herein except as set forth in the appended claims.

What we claim and desire to secure by Letters Patent is:

1. A logical element comprising, a bridge circuit comprising, a series combination of elements having n-type conductivity connected in the same sense forming two arms of said bridge circuit, two transformer secondary windings connected forming two other arms of said bridge circuit, two coupling lines each having an input coupling resistance therein and forming a balanced parallel wire system connected to said bridge circuit, said coupling lines having input connections for applying a pulse signal to said coupling lines of either negative or positive polarity and representative of an information pulse signal, output connections on said two coupling lines, means to establish alternatively two stable states of operation in said n-type elements corresponding to the positive and negative polarities of said information signal upon application of said information signal comprising connections connecting said coupling lines respectively to a connection point between the series n-type elements and to a connection point between said secondary windings, a transformer primary winding inductively coupled in operation to said secondary windings, connections to said primary winding for applying an excitation signal thereto simultaneously with the application of said information pulse signal to develop at said output connections an output signal having a polarity corresponding to the polarity of said information signal.

2. A logic element according to claim 1, in which said elements having n-type conductivity comprise two n-type semiconductors.

3. A logic element according to claim 1, in which said elements having n-type conductivity comprise two tunnel diodes.

4. A logical element comprising, a bridge circuit comprising, a series combination of elements having n-type conductivity connected in the same sense forming two arms of said bridge circuit, two transformer secondary windings connected having series resistances connected between and in series with them and forming jointly with said windings two other arms of said bridge circuit, a capacitor connected across said resistances jointly forming therewith an auto-bias voltage supplier, two coupling lines each having an input coupling resistance therein and forming a balanced parallel wire system connected to said bridge circuit, at least one of said coupling lines having an input connection for applying a pulse signal to said bridge circuit of either negative or positive polarity and representative of an information pulse signal, output connections on said two coupling lines, means to establish alternatively two stable states of operation in said n-type elements corresponding to the positive and negative polarities of said information signal upon application of said information signal comprising connections connecting said coupling line having an input connection and the other coupling line respectively to a connection point between said resistances connected in series with said secondary windings and to a connection point between the series n-type elements, a transformer primary winding inductively coupled in operation to said secondary windings, connections to said primary winding for applying an excitation signal thereto simultaneously with the application of said information pulse signal to develop at said output connections an output signal having a polarity corresponding to the polarity of said information signal.

5. In combination, the logical elements connected in cascade, each logical element comprising, a bridge circuit comprising a series combination of elements having n-type conductivity connected in the same sense forming two arms of said bridge circuit, two transformer secondary windings connected forming two other arms of said bridge circuit, two coupling lines each having at least one input coupling resistance therein and forming a balanced parallel wire system connected to said bridge circuit of each logical element, said coupling lines having one input connection for applying a pulse signal to one of said coupling lines of either negative or positive polarity and representative of an information pulse signal, output connections on said two coupling lines, means to establish alternatively two stable states of operation in said n-type elements of said logical elements corresponding to the positive and negative polarities of said information signal upon application of said information signal comprising separate connections connecting said coupling line having said information signal applied thereto to respective secondary windings of each of said logical elements, and separate connections from the other of said lines to respective connection points intermediate said n-type elements, a transformer primary winding for each logical element inductively coupled in operation to said secondary windings thereof, connections to the primary windings for applying an excitation signal thereto simultaneously with the application of said information pulse signal to develop at said output connections an output signal having a polarity corresponding to the polarity of said information signal, and a connection to ground from one of said connections from said other line to one of said connection points intermediate the n-type elements of one of said logical elements.

6. In the combination according to claim 5 in which said connection to ground is connected to one of said connections connected to a point intermediate the n-type elements of said logical elements comprising an output connection of one of said logical elements and an input connection of a next following logical element.

7. In the combination according to claim 5, in which said connection to ground is connected to one of said connections connected to a point intermediate the n-type elements of said logical elements comprising an output connection of a logical element following the other logical element.

8. In a logical element comprising, a bridge circuit comprising, a series combination of elements having n-type conductivity connected in the same sense forming two arms of said bridge circuit, two transformer secondary windings connected forming two other arms of said bridge circuit, two coupling lines each having an input coupling resistance therein and forming a balanced parallel wire system connected to said bridge circuit, said coupling lines each having an odd number of input connections for applying signals thereto of negative and positive polarity for majority operation and representative of an information, output connections on said two coupling lines, means to establish alternatively two stable states of operation in said n-type elements corresponding to the positive and negative polarities of said information signal upon application of said information signal comprising connections connecting said coupling lines respectively to a connection point between the series n-type elements and to a connection point between said secondary windings, a transformer primary winding inductively coupled in operation to said secondary windings, connecnections to said primary winding for applying an excitation signal thereto simultaneously with the application of said information signals to develop at said output connections an output signal having a polarity corresponding to the polarity of the majority of said information signals.

9. A logical element according to claim 8, in which said input connections for majority operation comprise three-input connections for each line for receiving respective ones of three simultaneously applied signal and said excited signals comprising sinusoidal signals having at least three phases with phase differences thereof equal to each other.

10. A logical element comprising, a bridge circuit comprising, a series combination of elements having n-type conductivity connected in the same sense forming two arms of said bridge circuit, a transformer secondary winding connected forming two other arms of said bridge circuit, two coupling lines each having an input coupling resistance therein and forming a balanced parallel wire system connected to said bridge circuit, said coupling lines having input connections for applying a pulse signal to said coupling lines of either negative or positive polarity and representative of an information pulse signal, means to establish alternatively two stable states of operation in said n-type elements corresponding to the positive and negative polarities of said information signal upon application of said information signal comprising connections connecting said coupling lines respectively to a connection point between the series n-type elements and to a connection point substantially at the electrical center of said secondary winding, a transformer primary winding inductively coupled in operation to said secondary winding, another secondary winding and a pair of series diodes connected in parallel with the first-mentioned secondary winding in said bridge circuit, another primary winding inductively coupled in operation with said other secondary winding and receptive in operation of a read out signal simultaneously with the application of said information signal, an output connection connected to said other secondary winding and an output connection connected intermediate said n-type elements, connections to the first-mentioned primary winding for applying an excitation signal thereto simultaneously with the application of said information pulse signal to develop at said output connections an output signal having a polarity corresponding to the polarity of said information signal.

11. A logical element comprising, a bridge circuit comprising, in push-pull arrangement two circuits, comprising two transformer secondary windings and a series combination of elements having n-type conductivity connected in the same sense intermediate said transformer windings in parallel therewith, a pair of diodes connected in one of said circuits in opposite senses in series with one of said secondary windings, means to establish alternatively two stable states of operation in said n-type elements corresponding to positive and negative polarities of an information signal upon application of said information signal comprising means comprising at least one primary winding for applying said information signal to one of said secondary windings other than the one connected to said diodes, connections respectively connected to a respective connection point each corresponding to the electrical center of said secondary windings for impressing a voltage signal thereon, one of said connections being connected to the secondary winding connected in series with said diodes for alternative application of a bias voltage thereon and a read out signal of the same polarity as said information signal, an output transformer winding inductively coupled in operation to said secondary winding, connected to said diodes for developing therein an output simultaneously with the application of said information signal, and said output at said transformer output winding having a polarity corresponding to the alternative polarities of said information signal.

12. A logical element according to claim 11, in which said means comprising at least said one primary winding comprising an odd number of primary windings for applying an information signal to said logical element dependent upon majority decision operation.

13. A logical element comprising, a bridge circuit comprising a series combination of elements having n-type conductivity connected in the same sense in said bridge circuit, at least one transformer secondary winding connected forming two arms of said bridge circuit, means to establish alternatively two stable states of operation in said n-type elements corresponding to positive and negative polarities of an information signal upon application of said information signal comprising means for applying said information signal to said bridge, an output circuit connected to said n-type elements, connections connected to a connection point corresponding to the electrical center of said secondary winding for applying bias voltages thereto simultaneously with the application of said information signal to develop at said output circuit an output signal having a polarity corresponding to the polarity of said information signal.

14. In combination, two logical elements connected in cascade, each logical element comprising, a bridge circuit comprising a series combination of elements having n-type conductivity connected in the same sense in said bridge circuit, at least one transformer secondary winding connected forming two arms of said bridge circuit, means to establish alternatively two stable states of operation in said n-type elements of said logical elements corresponding to positive and negative polarities of an information signal upon application of said information signal comprising, means for applying excitation signals to the bridge circuits of said logical elements successively, each logical element having an output circuit connected to the n-type elements thereof and the output circuit of said one logical element connected to the bridge circuit of a following logical element, each logical element comprising separate connections connected to a connection point corresponding to the electrical center of said secondary winding of each of said logical element for applying voltage signals thereto alternatively of two polarities simultaneously with the application of said excitation signals to develop at said output connections an output signal having a polarity corresponding to the polarity of said voltage signal, and the voltages applied to said logical elements comprising the information signal applied to said logical elements.

References Cited in the file of this patent
UNITED STATES PATENTS
2,614,140    Kreer _____ Oct. 14, 1952

OTHER REFERENCES

Chow: "Tunnel Diode Logic Circuits," Electronics, June 24, 1960, pages 103 to 107 (pages 104, 105, 106 relied on).

Lesk et al.: "The Tunnel Diode . . .," Electronics, November 27, 1959, pages 60–64 (page 64 relied on).